(12) United States Patent
Greenwald et al.

(10) Patent No.: US 7,523,387 B1
(45) Date of Patent: Apr. 21, 2009

(54) CUSTOMIZED ADVERTISING IN A WEB PAGE USING INFORMATION FROM THE WEB PAGE

(75) Inventors: Jared Greenwald, Marietta, GA (US); Evans Hall, Atlanta, GA (US); Timothy Messier, Atlanta, GA (US)

(73) Assignee: The Weather Channel, Inc., Atlanta, GA (US)

(*) Notice: Subject to any disclaimer, the term of this patent is extended or adjusted under 35 U.S.C. 154(b) by 386 days.

(21) Appl. No.: 10/966,564

(22) Filed: Oct. 15, 2004

(51) Int. Cl.
*G06F 17/00* (2006.01)

(52) U.S. Cl. .................................. 715/205; 705/14

(58) Field of Classification Search ................ 715/513, 715/501.1, 517, 205, 234, 243; 705/14
See application file for complete search history.

(56) References Cited

U.S. PATENT DOCUMENTS

| | | | | |
|---|---|---|---|---|
| 5,654,886 A | * | 8/1997 | Zereski et al. ................. | 702/3 |
| 5,848,396 A | * | 12/1998 | Gerace ......................... | 705/10 |
| 6,144,944 A | * | 11/2000 | Kurtzman et al. ............. | 705/14 |
| 6,639,610 B1 | * | 10/2003 | Sponheim et al. ........... | 715/760 |
| 7,028,072 B1 | * | 4/2006 | Kliger et al. ................. | 709/203 |
| 7,030,890 B1 | * | 4/2006 | Jouet et al. ................... | 345/619 |
| 7,080,018 B1 | * | 7/2006 | Fox et al. ........................ | 705/1 |
| 2002/0063714 A1 | * | 5/2002 | Haas et al. ................... | 345/473 |
| 2002/0161633 A1 | * | 10/2002 | Jacob et al. ................... | 705/14 |
| 2002/0174230 A1 | * | 11/2002 | Gudorf et al. ............... | 709/227 |
| 2004/0225647 A1 | * | 11/2004 | Connelly et al. ............... | 707/3 |

OTHER PUBLICATIONS

Na, Jin-Cheon, et al, "Hypermedia and Graphics 1: Dynamic Documents: Authoring, Browsing, and Analysis Using a High-Level Petri Net-Based Hypermedia System", Proceedings of the 2001 ACM Symposium on Document Engineering DocEng '01, Nov. 2001, pp. 38-47.*
Knoblock, Craig A., et al, "Mixed-Initiative, Multi-Source Information Assistants", Proceedings of the 10th International Conference on World Wide Web WWW '01, Apr. 2001, pp. 697-707.*

* cited by examiner

*Primary Examiner*—Laurie Ries
(74) *Attorney, Agent, or Firm*—Woodcock Washburn LLP

(57) ABSTRACT

The method of providing a web page that uses geographic and/or weather-related information from definitions in the page in a graphical advertising message. The ad can be dynamically altered based on a wide variety of variables that are defined on a web page. By being able to change ad messaging and visuals in real time based on the presence of variables in web pages ADapters can prove to be extremely contextually relevant as well as operationally efficient.

20 Claims, 8 Drawing Sheets

```
<SCRIPT LANGUAGE="JavaScript">
<!--
OAS_MJX_on = true; // when true, this allows the MJX ad request to be made
OAS_spoof = '/5day/us/ga/524/atlanta/30339.';
OAS_listpos =
'HeaderSpon,PageSpon,PageSpon2,LocalAd,WXSpon,Explore1,Explore2,Explore3,Explore4,Explore5,Explore6,
LocalSite1,LocalSite2,LocalSite3,LocalSite4,LocalSite5,LocalSite6,LocalSite7,LocalSite8,Shopping1,Shopping2,
Shopping3,Shopping4,Sweeps,PollSpon,Hidden1';
OAS_query =
'family=undeclared&context=forecast&temp=82&uv=0&humid=45&dew=59&wind=3&cond=cloud_mostly&templ1
=66&temph2=85&templ2=65&fcond2=thunder_isolated_tstorm&temph3=88&templ3=66&fcond3=cloud_mostly&p
ollen=3&mosq=4';
CM_tag = 'undcl_city';
// -->
</SCRIPT>
```

Fig. 4A

```
<!-- campaign: %%CAMP%% page: %%PAGE%% position: %%POS%% -->
<!-- CLICK: https://www.dunkindonuts.com/aboutus/store/Search.aspx -->
<SCRIPT LANGUAGE=JavaScript>
<!--
// OAS_spoof = '/5day/us/ga/524/san_antonio/30306.';
// OAS_query =
'family=undeclared&context=forecast&temp=85&uv=7&humid=43&dew=60&wind=10&cond=cloud_partly&templ1=65&fcond1=clear_sunny&temph2=89&templ2=67&fcond2=clear_sunny&temph3=90&templ3=70&fcond3=clear_sunny&pollen=3&mosq=3';
// OAS_query='family=undeclared&context=climo';
var page = OAS_spoof;
var cm_query = OAS_query;
var t1 = cm_query.search("forecast&temp=");
var t2 = cm_query.search("&uv=");
if(t1>0){
    var tempNum = cm_query.slice(t1+14, t2)
    if(tempNum > 80){
        tempNum = tempNum+ "";
    } else {
        tempNum = "getting hot"
    }
} else {
    var tempNum = "getting hot";
}
//var page = "%%PAGE%%";
myRE = /V(\d{3})V([A-Za-z_])/;
var swf_file = "http://image.weather.com/RealMedia/ads/Creatives/creative_repository/dunkin/dunkin_728x90_0802.swf";
myRE.exec(page);
// var dma = RegExp.$1;
var city = RegExp.$2;
city = city.replace(/_/g, " ");
// city = city.toUpperCase();
function capString(stString){
    // making the array
    var arString = stString.split(' ');
    // capping each word'
    for (var i = 0; i < arString.length; i++){
        // cap 'word'
        arString[i] = arString[i].substring(0,1).toUpperCase() + arString[i].substring(1);
    }
    // re-assemble and return
    return arString.join(" ");
}
city = capString(city);
```

Fig. 4B

```
var plugin = 0;
if (navigator.mimeTypes && navigator.mimeTypes["application/x-shockwave-flash"] && navigator.mimeTypes["application/x-shockwave-flash"].enabledPlugin)
{
if (navigator.plugins && navigator.plugins["Shockwave Flash"])plugin = 6;
}
else if (navigator.userAgent && navigator.userAgent.indexOf("MSIE")>=0
&& (navigator.userAgent.indexOf("Windows 95")>=0 || navigator.userAgent.indexOf("Windows 98")>=0 || navigator.userAgent.indexOf("Windows NT")>=0)) {
document.write('<SCRIPT LANGUAGE=VBScript> \n'
+ 'on error resume next \n'
+ 'plugin = ( IsObject(CreateObject("ShockwaveFlash.ShockwaveFlash.6")))\n'
+ '</SCR'+'IPT> \n');
}
if ( plugin )
{
d = document;
d.write('<object classid="clsid:d27cdb6e-ae6d-11cf-96b8-444553540000" codebase="http://fpdownload.macromedia.com/pub/shockwave/cabs/flash/swflash.cab#version=6,0,0,0" width="728" height="90" id="citywise_728x90" align="middle">');
d.write('<param name="allowScriptAccess" value="sameDomain" />');
d.write('<param name="FlashVars" value="externalTown=' + city + '&externalTemp=' + tempNum + '"/>');
d.write('<param name="movie" value="" + swf_file + '?clickTAG=http://www.weather.com/RealMedia/ads/click_lx.ads/%%PAGE%%/%%RAND%%/%%POS%%/%%CAMP%%/%%IMAGE%%/%%USER%%?" />');
d.write('<param name="quality" value="high" />');
d.write('<param name="bgcolor" value="#ffffff" />');
d.write('<embed src="' + swf_file + '?clickTAG=http://www.weather.com/RealMedia/ads/click_lx.ads/%%PAGE%%/%%RAND%%/%%POS%%/%%CAMP%%/%%IMAGE%%/%%USER%%?" quality="high" bgcolor="#ffffff" width="728" height="90" name="citywise_728x90" FlashVars="externalTown=' + city + '&externalTemp=' + tempNum + '" align="middle" allowScriptAccess="sameDomain" type="application/x-shockwave-flash" pluginspage="http://www.macromedia.com/go/getflashplayer" /></object>');
} else {
document.write('<A HREF="http://www.weather.com/RealMedia/ads/click_lx.ads/%%PAGE%%/%%RAND%%/%%POS%%/%%CAMP%%/%%IMAGE%%/%%USER%%?"><img src="http://image.weather.com/RealMedia/ads/Creatives/creative_repository/dunkin/dunkin_728x90.gif" width=728 height=90 border="0"></A>');
}
//-->
</SCRIPT>
<NOEMBED>
<A HREF="http://www.weather.com/RealMedia/ads/click_lx.ads/%%PAGE%%/%%RAND%%/%%POS%%/%%CAMP%%/%%IMAGE%%/%%USER%%?"><IMG SRC="http://image.weather.com/RealMedia/ads/Creatives/creative_repository/dunkin/dunkin_728x90.gif" width=728 height=90 BORDER=0></A>
</NOEMBED>
<NOSCRIPT>
<A HREF="http://www.weather.com/RealMedia/ads/click_lx.ads/%%PAGE%%/%%RAND%%/%%POS%%/%%CAMP%%/%%IMAGE%%/%%USER%%?"><IMG SRC="http://image.weather.com/RealMedia/ads/Creatives/creative_repository/loyola/dunkin/dunkin_728x90.gif" width=90 height=90 BORDER=0></A>
</NOSCRIPT>
```

Fig. 5

```
// we know that this is running in a CITY PAGE, so there's no doubt about city name.
// also know that it's one of three cities, all with short names.

_root.onEnterFrame=function(){
        var_txt.text = "It's " + _root.externalTemp + " in " + _root.externalTown + ".";
        // this will resize the city width if name is too long.
        if(var_txt.length > 22){
                var_txt._xscale = 90;
        }
}
```

CUSTOMIZED ADVERTISING IN A WEB PAGE USING INFORMATION FROM THE WEB PAGE

FIELD OF THE INVENTION

The present invention relates in general to the field of computer science. More particularly, the present invention relates to a method of providing customized ads in a web page using information contained in variable definitions in the web page markup language.

BACKGROUND OF THE INVENTION

The majority of Internet advertising is ineffective because most advertising is ignored by the audience. For example, pop-up and pop-under ads are considered to be a nuisance. If a pop-up ad is displayed, often users simply close the window without viewing the ad. Browsers now come with tools to eliminate these ads so the are almost never seen. Further, ads that are embedded in web pages are often not relevant to the user's interests. While these ads may be viewed by the user, they are treated as background and do not grab the user's attention.

Advertising campaigns that are successful are presented to consumers at the right time and place and they communicate persuasive messages that are contextually relevant to the activity the consumer is engaged in. Thus, there is a need for a method of advertising on a web site to utilize information from a web page a user has requested in order to customize the ad message presented on that page. By doing so, the ad becomes more tightly integrated with the activity the user is performing and as a matter of course, more contextually relevant.

SUMMARY OF THE INVENTION

The present invention is directed to systems and methods for providing a graphic in a web page using information contained within the web page. A method includes providing variable definitions in the web page; identifying the variable definitions that pertain to the graphic; providing a wrapper within the web page; and populating the graphic within the wrapper with first information contained in the variable definitions.

In accordance with a feature of the invention, the method may include receiving a preference input and populating the variable definitions with the preference input. The preference input may be a location parameter. The web page may be dynamically generated based on the preference input. In addition, the graphic may be populated with second information contained in the variable definitions of the dynamically generated web page. The graphic may be a Flash movie.

In accordance with another aspect of the invention, there is provided a method of generating a dynamic web page having a graphic containing information contained within the web page. This method includes receiving preference information regarding content to be displayed in the dynamic web page; providing variable definitions in the web page containing the preference information; identifying the variable definitions that pertain to the graphic; formatting the variable definitions for use in the graphic; providing a wrapper within the web page; and populating the graphic within the wrapper with the preference information contained in the variable definitions.

In accordance with another method of the invention, a web page may be generated having a graphic containing preference information received by a user input. This method includes receiving the user input specifying content to be displayed; providing variable definitions in the web page containing the preference information; providing a wrapper within the web page; and populating the graphic within the wrapper with the preference information contained in the variable definitions.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 4A and 4B illustrate exemplary software code that parses through the various keyname/keyvalue pairs that will be used in an ad message;

DETAILED DESCRIPTION OF ILLUSTRATIVE EMBODIMENTS

Figure 1:
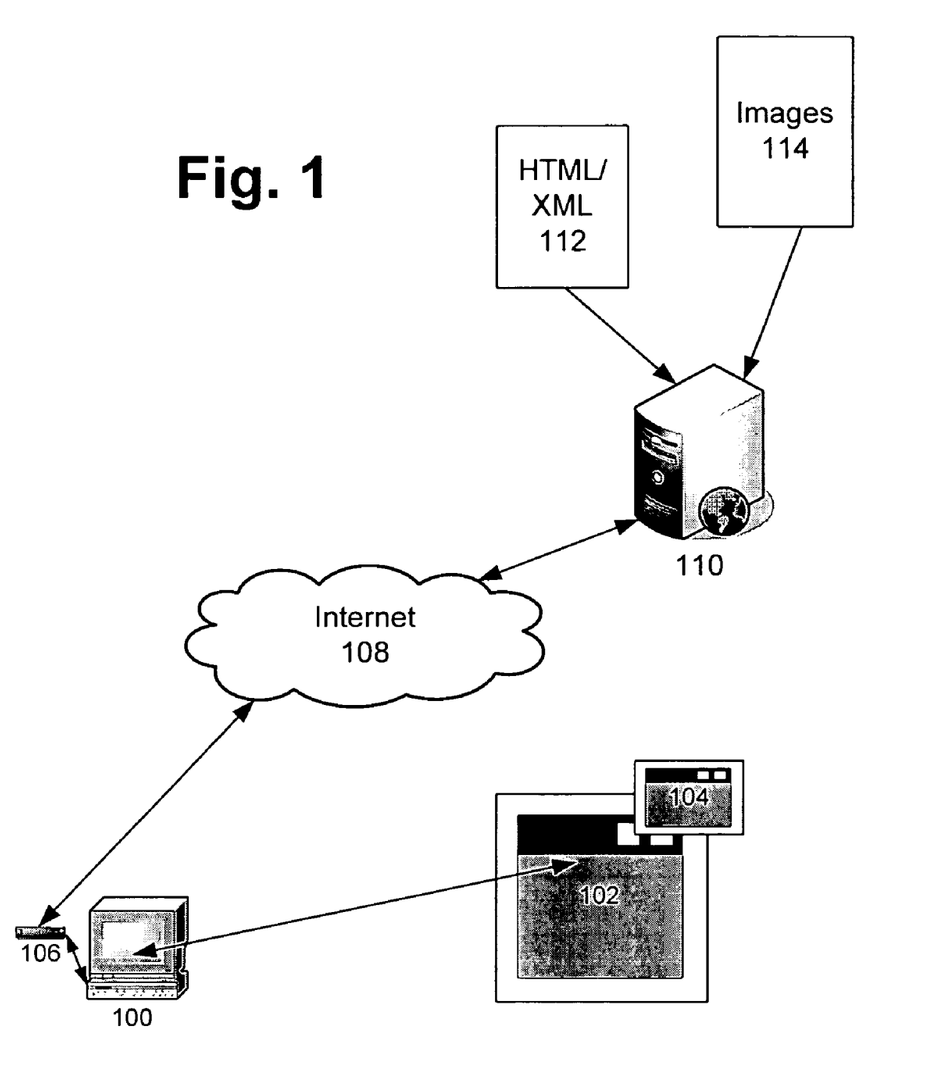
FIG. 1 is an overview of the environment in which the present invention operates.

The present invention is directed to an "ADapter" technology that uses geographic and/or weather-related information in a message accompanying ads retrieved from a web server. Referring to FIG. 1, there is illustrated an overview of the environment in which the present invention operates. As shown in the Fig., a personal computer 100 runs a web browser 102 to fetch and display HTML/XML documents. In this implementation, the web browser 102 may be any known web browser such as Internet Explorer, Netscape Navigator, Mozilla Firefox, etc. The web browser 102 fetches HTML/XML documents from a web server 110 via a modem 106 (e.g., cable modem, DSL modem, or conventional modem) connected to the Internet 108. The web server 110 serves, e.g., HTML/XML documents 112 and images 114. Other media, such as flash media, video, audio, etc. may be played by a player 104 that is embedded the web page as displayed in the browser 102 or as a separate application.

When a user connects to the web server 110 the browser 120 points to a specified URL of the document to be retrieved. A TCP/IP connection is established with the web server 110 and a request is issued for the document stored at the specified URL by issuing an HTTP request to the server 200. An addition to HTML code, this document can incorporate other information content, such as images 114, audio, video, executable programs, etc. The document 112 and images 114 are stored as files in a file system of the web server 110. The document 112 may incorporate the images 114 using HTML tags that specify the location of files or other Internet resource containing the images on the Internet 108.

When users navigate to a web site, such as weather.com, they enter a geographic location in order retrieve weather data for that location. After the user submits the desired geographic location, a weather.com forecast page is built dynamically to determine which weather forecast to include on the resulting page. ADapters, in accordance with the present invention, use the geographic location information to dynamically change the messaging in an ad served as an image, flash media presentation, etc. A headline can be altered in real time to reference the geographic location. For example, "Gas prices are rising in Los Angeles. Check out the latest gas/electric hybrid autos from Honda."

ADapters can also use this geographic information to pre-populate search functions within an ad. For example, a user viewing weather information about Atlanta may receive an ad that reads, "In Atlanta, New Jobs Are Posted Every Day. Find Your Dream Job Today!" Below the headline, there may be provided a tool to search job opportunities on a provider's web site. ADapter technology of the present invention may use the zip code from the search the user conducted to get the applicable weather forecast to populate the zip code form field of the ad. All the user has to do is select a career category and hit a search button to be presented with a list of applicable job opportunities on the providers web site.

In addition to geographic information, ADapter technology can identify and use weather condition and forecast information. Because this information is included on weather forecast pages the ad is served to, an ADapter can use it to modify the ad messaging or content in real time. An example is an ADapter that identifies the current temperature as reported on the page it served to (as well as the geography) and incorporates it in the ad's headline—"It's 90° in Boston. You've GOT to try our new Iced Mocha Latte." This ADapter may also use preexisting weather thresholds to only be served when the current temperature is above 75°.

Figure 2:
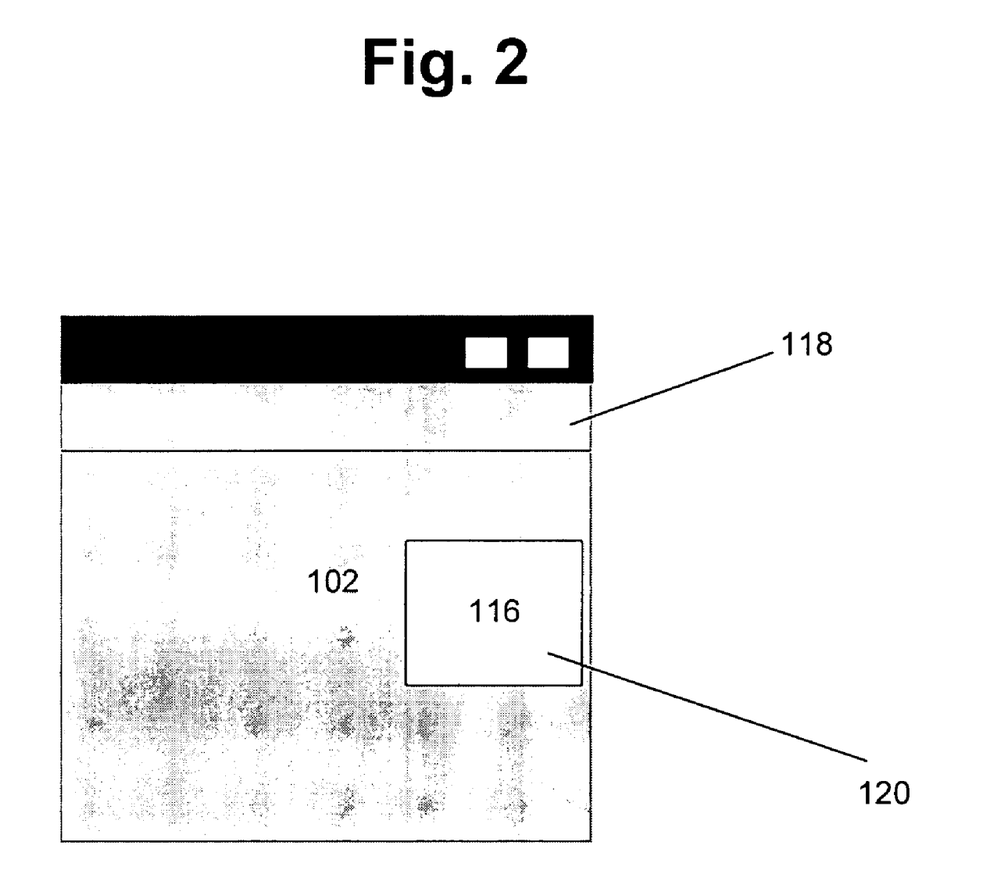
FIG. 2 is an illustration of an exemplary document that may be used to implement the present invention.

Referring now to FIG. 2, there is illustrated an exemplary document 112 that may be used to implement the ADapters of the present invention. In documents 112 served by the web server 110 (e.g., an Open AdStream server), a variable setup portion (OAS_setup) 118 is defined. Open AdStream servers are available from 24/7 Real Media, Inc., and enable web servers to target and deliver ad campaigns to precise demographic, geographic and anonymous data. The OAS_setup 118 portion includes variable definitions, such as an OAS_spoof variable contains the geographic definitions and an OAS_query variable that contains weather and/or lifestyle conditions. It is noted that the variables may contain definitions, conditions, etc. other than geographic and/or weather are not limited to geography and/or weather. These variables will be discussed in greater detail with reference to FIG. 3.

An HTML wrapper 120 is served through by the web server 110 (or another ad server referenced by a URL) that retrieves and formats variables from the OAS_Setup 118. The wrapper 120 references, e.g., a Flash movie file 116 to insert into the wrapper 120 and sets up variables for use in a Flash Actionscript. The Actionscript in the Flash movie file 116 inserts the variables from the OAS_setup 118 at appropriate frames in the Flash movie file 116. The Flash movie file 116 may also format the variables to match static portions of ads served by web server 110.

Figure 3:
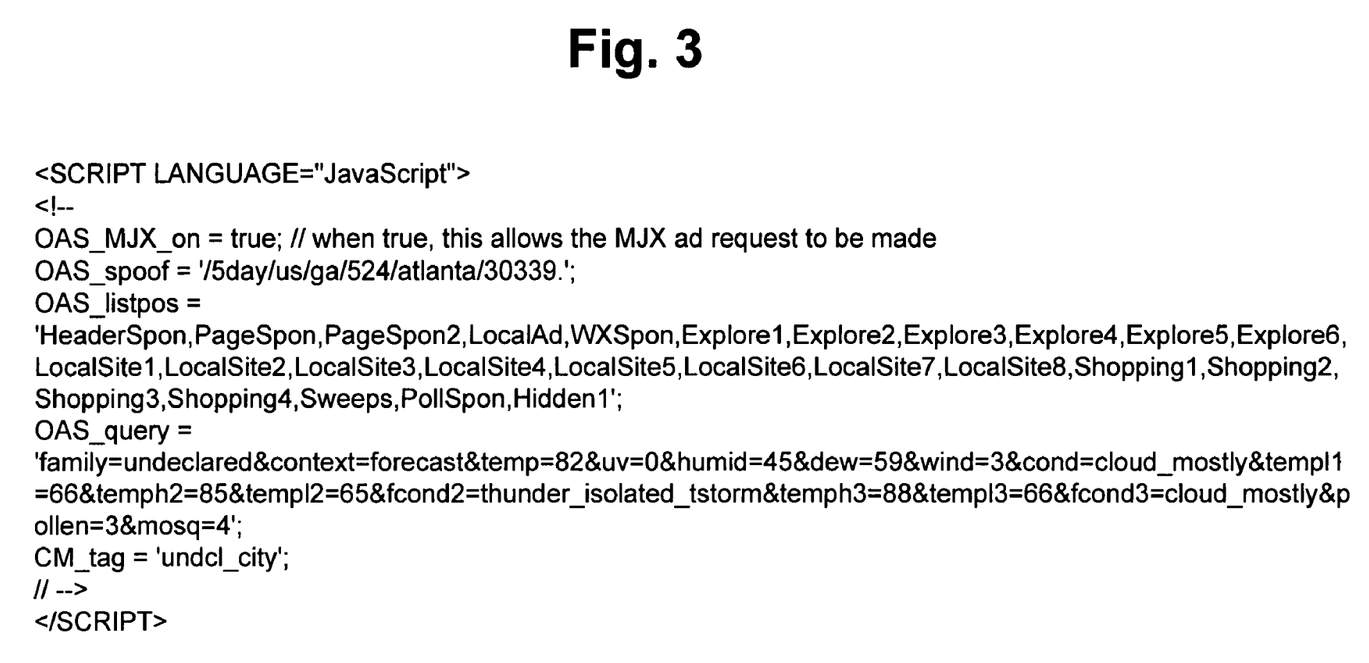
FIG. 3 is an example of an OAS_Setup in the document of FIG. 2.

Referring now to FIG. 3, there is illustrated an example of the OAS_Setup for a document 114 served by weather.com that includes a weather forecast for ZIP code 30339. The web server 100 uses predefined ad tags on all weather.com pages to allow weather.com to target ad campaigns in a number of predefined ways. These tags are preferably setup as JavaScript variables in a setup section.

The OAS_spoof JavaScript variable is a virtual URL for the page that indicates the targeting hierarchy for the page. On weather forecast pages it indicates geography down to the ZIP code level on domestic pages. ADapter code parses the spoof URL to find the town/city name and/or zip code, depending on what will be used in the ad message. The OAS_query JavaScript variable is a string of keyname/keyvalue pairs that indicates a number of supplemental ad targeting criteria for the page. The keyname/keyvalue pairs are run together in a string separated by ampersands.

Figure 4B:
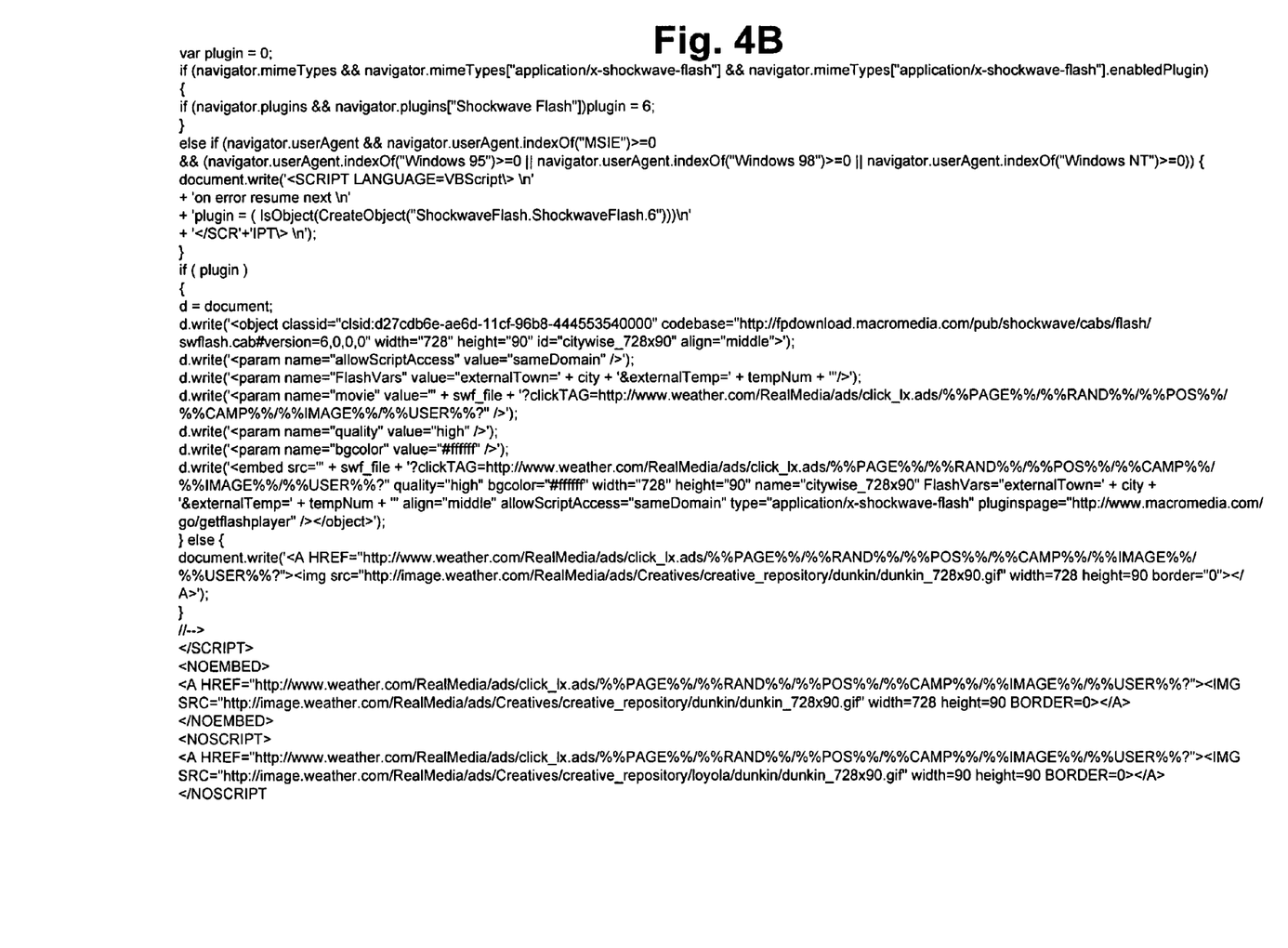

ADapters use a combination of JavaScript code and MacroMedia Flash MX 2004 functionality to identify variables from a page and make dynamic ad messaging and format decisions based on those variables. The variables are set in JavaScript from the ad server setup, and they are parsed to obtain the correct information. Then they are reformatted for presentation purposes in the ad. FIGS. 4A and 4B, illustrate exemplary software code that parses through the various keyname/keyvalue pairs to find the pairs that reflect the weather condition that will be used in the ad message.

Figure 5:
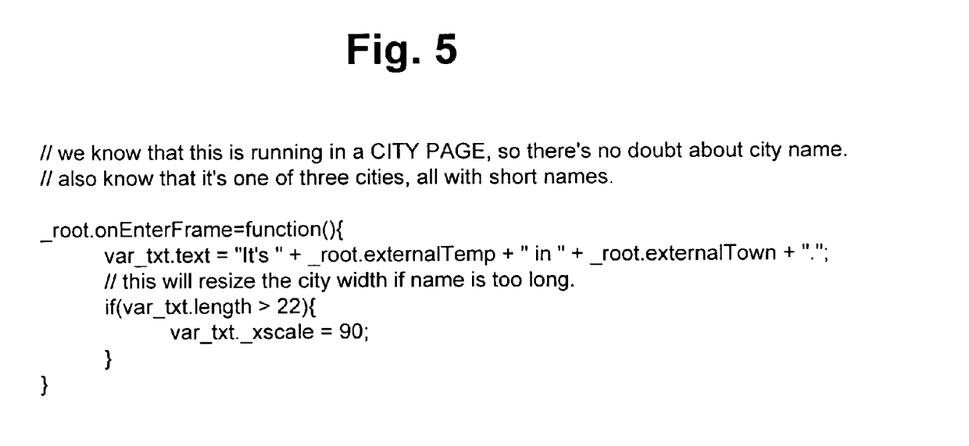
FIG. 5 is exemplary code of a Flash function that renders variables in an ad message.

FIG. 5 illustrated exemplary code of a Flash function that renders variables in ad message. The exemplary code is written in ActionScript.

Thus, as described above, an ADapter can completely alter its presentation dynamically based on a wide variety of variables that are defined on a web page. By being able to change ad messaging and visuals in real time based on the presence of variables in web pages ADapters can prove to be extremely contextually relevant as well as operationally efficient. Instead of producing 10 individual ads to run in 10 markets, with differing messages for each market, one ADapter can be produced with the alterations per market built in.

Figure 6:
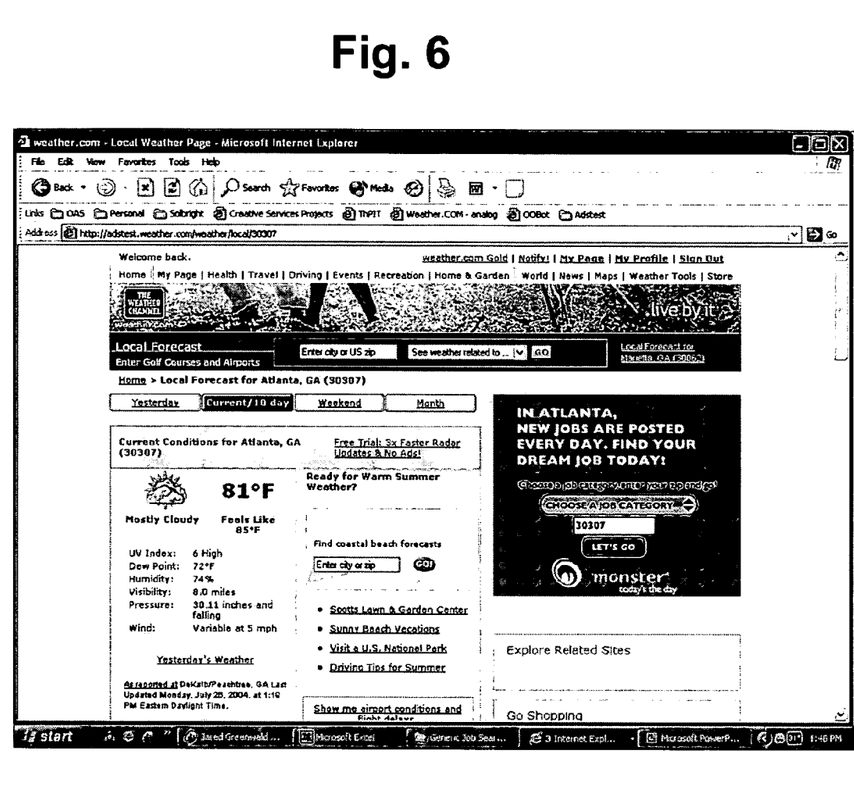
FIGS. 6 and 7 are exemplary web pages implementing the present invention.
Figure 7:
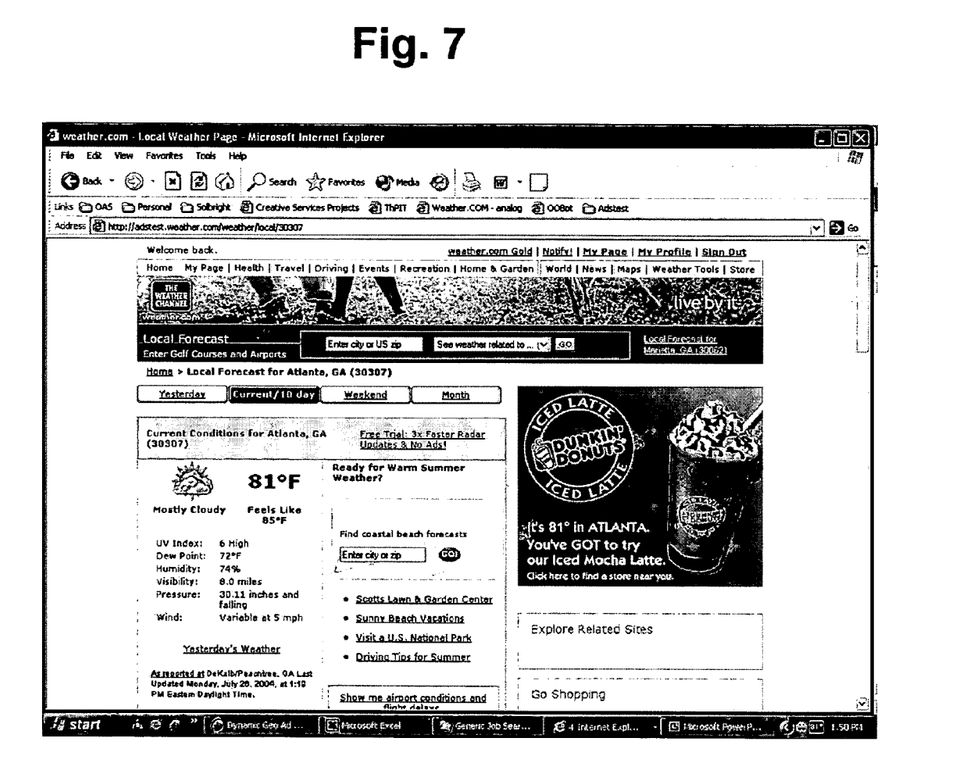

FIGS. 6 and 7 illustrate two exemplary ADapters for a web page presenting information about Atlanta, Ga. As illustrated in FIGS. 6 and 7, the ads present custom messages directed to Atlanta, as well as use weather-related information from the web page.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method, implemented in at least one computing device, of dynamically changing the messaging in an ad served as an image in a web page utilizing information from a web page requested by a user, the method comprising:
   receiving a request from a user for a web page at a web server;
   loading the web page;
   declaring the web page to an ad server;
   retrieving an ad based upon geographic information contained within variable definitions in the requested web page;
   delivering the retrieved ad to the web page;
   dynamically modifying the retrieved ad using the variable definitions in the requested web page in order to customize the ad in real time, the variable definitions used to dynamically modify the retrieved ad comprising the geographic information and second information; and
   serving the retrieved and customized ad on the web page to the user.

2. The method of claim 1, wherein the second information comprises weather-related information.

3. The method of claim 1, wherein the second information comprises lifestyle-related information.

4. The method of claim 1, wherein the dynamically modified ad served on the web site includes the geographic information and second information.

5. The method of claim 1, further comprising using the geographic information in the variable definitions to dynamically pre-populate search functions within the retrieved ad.

6. The method of claim 1, further comprising:
receiving the geographic location information from the user;
retrieving weather data for the geographic location; and
producing the geographic location and the weather data in the dynamically modified retrieved ad.

7. The method of claim 6, wherein the weather data further comprises weather condition and weather forecast information.

8. The method of claim 1, wherein the dynamically modifying the retrieved ad is accomplished in substantially real time during the current web browsing session.

9. The method of claim 1, further comprising a preexisting weather threshold, wherein the message accompanying the retrieved ad is only modified when the preexisting weather threshold is exceeded.

10. The method of claim 9, wherein the preexisting weather threshold further comprises a current weather condition.

11. The method of claim 1, further comprising dynamically changing a visual accompanying the retrieved ad using the variable definitions in the requested web page.

12. A method, implemented in at least one computing device, of providing and dynamically modifying an ad graphic in a web page using information contained within the web page, the method comprising:
receiving a geographic region input;
providing variable definitions in the web page;
populating the variable definitions in the web page with geographic information corresponding to the geographic region input;
identifying the variable definitions in the web page that pertain to the ad graphic;
providing a wrapper within the web page;
populating the ad graphic within the wrapper with the geographic information contained in the variable definitions in the web page that pertain to the ad graphic;
dynamically generating the web page based on the geographic region input;
populating the ad graphic with second information contained in the variable definitions of the dynamically generated web page; and
dynamically modifying the ad graphic using the variable definitions in the web page in order to customize the ad graphic in real time, the variable definitions used to dynamically modify the ad graphic including the geographic information and the second information.

13. The method of claim 12, wherein the second information is weather-related data.

14. The method of claim 12, wherein the second information is lifestyle-related data.

15. The method of claim 12, wherein the ad graphic is a Flash movie.

16. The method of claim 12, wherein the variable definitions contain keyname/keyvalue pairs that determine criteria for display of the ad graphic.

17. A method, implemented in at least one computing device, of generating a web page having an ad graphic containing preference information received by a user input, the method comprising:
receiving the user input specifying content to be displayed, the user input including a geographic location;
providing variable definitions in the web page containing the preference information, the preference information including weather data for the geographic location;
providing a wrapper within the web page;
populating the ad graphic within the wrapper with the preference information contained in the variable definitions; and
dynamically modifying the ad graphic using the variable definitions in the web page in order to customize the ad graphic in real time, the variable definitions used to dynamically modify the ad graphic including the weather data for the geographic location.

18. The method of claim 17, further comprising URL to information to be displayed based on the preference information, wherein the URL to information is called dynamically based upon the geographic location derived from the variable definitions in the web page.

19. The method of claim 17, wherein the variable definitions contain keyname/keyvalue pairs that determine criteria for display of the graphic.

20. The method of claim 17, further comprising populating data input fields within the graphic with the preference information.

* * * * *